United States Patent
Huynh et al.

(10) Patent No.: US 9,783,078 B2
(45) Date of Patent: Oct. 10, 2017

(54) SYSTEMS AND METHODS FOR DISENGAGING A BATTERY

(71) Applicant: Faraday & Future Inc., Gardena, CA (US)

(72) Inventors: Long Huynh, Gardena, CA (US); Michael Hong, Gardena, CA (US); Phillip John Weicker, Pasadena, CA (US); Anil Paryani, Cerritos, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 35 days.

(21) Appl. No.: 14/928,718

(22) Filed: Oct. 30, 2015

(65) Prior Publication Data
US 2017/0120770 A1    May 4, 2017

(51) Int. Cl.
| | |
|---|---|
| *H02P 1/00* | (2006.01) |
| *B60L 11/18* | (2006.01) |
| *H02P 21/00* | (2016.01) |
| *H02P 6/08* | (2016.01) |
| *H02P 6/12* | (2006.01) |
| *H02P 3/14* | (2006.01) |
| *H02P 29/02* | (2016.01) |

(Continued)

(52) U.S. Cl.
CPC ............ *B60L 11/1864* (2013.01); *H02P 3/14* (2013.01); *H02P 6/08* (2013.01); *H02P 6/12* (2013.01); *H02P 21/0035* (2013.01); *H02P 29/021* (2013.01); *H02P 29/024* (2013.01); *H02P 29/027* (2013.01); *B60W 10/08* (2013.01); *Y02T 10/7005* (2013.01); *Y02T 10/7077* (2013.01)

(58) Field of Classification Search
CPC . Y02T 10/7005; Y02T 10/7077; Y02T 10/70; B60W 10/08; B60W 20/00

USPC ......................................................... 318/139
See application file for complete search history.

(56) References Cited

U.S. PATENT DOCUMENTS

| | | | |
|---|---|---|---|
| 8,228,037 B2 * | 7/2012 | Furukawa | B60L 3/0046 320/134 |
| 2009/0195199 A1 * | 8/2009 | Ito | B60L 3/003 318/400.22 |

(Continued)

FOREIGN PATENT DOCUMENTS

DE    102011011799 A1    8/2012

OTHER PUBLICATIONS

International Search Report and Written Opinion of the International Searching Authority for PCT/US2015/065978, mailed from the European Patent Office on Jul. 22, 2016.

*Primary Examiner* — Kawing Chan
*Assistant Examiner* — Bradley Brown
(74) *Attorney, Agent, or Firm* — Finnegan, Henderson, Farabow, Garrett & Dunner LLP

(57) ABSTRACT

Systems and methods for disengaging a battery are disclosed. The systems and methods may be used to disengage a battery from a direct-current (DC) bus of a vehicle when the DC bus is under a load. In one implementation, the system includes one or more contactors between the battery string and the DC bus. The system also includes a controller. The controller is configured to reduce a current limit of a power train of the vehicle to a first current level. The controller is also configured to open the one or more contactors. The controller is further configured to increase the current limit of the power train of the vehicle to a second current level.

15 Claims, 7 Drawing Sheets

(51) Int. Cl.
*H02P 29/024* (2016.01)
*B60W 10/08* (2006.01)

(56) References Cited

U.S. PATENT DOCUMENTS

| | | |
|---|---|---|
| 2012/0056477 A1 | 3/2012 | Herges et al. |
| 2015/0239366 A1* | 8/2015 | Jestin .................. B60L 15/38 |
| | | 307/10.1 |

* cited by examiner

SYSTEMS AND METHODS FOR DISENGAGING A BATTERY

TECHNICAL FIELD

The present disclosure relates generally to systems and methods for disengaging a battery, and more particularly, to systems and methods for disengaging a battery from a direct-current (DC) bus of a vehicle when the DC bus is under a load.

BACKGROUND

Battery-powered vehicles, such as electric vehicles or hybrid electric vehicles, may contain one or more high-voltage batteries connected to a DC bus. The high-voltage battery pack may be used as the primary power source of a vehicle to drive various primary loads (e.g., traction motors) and various auxiliary loads (e.g., HVAC, lighting, pumps, etc.). During operation, the battery pack or part of it may need to be taken offline due to faulty components or conditions in the battery pack. For high-voltage battery applications, such as electric vehicles, disconnecting the battery pack may be achieved by opening contactors connected between the battery pack and the high-voltage bus. Over time, the contactors may degrade and cause a safety hazard if they fail to open or close properly. A solution is needed to increase the reliability of the contactors and extend their useful life.

SUMMARY

Consistent with one disclosed embodiment of the present disclosure, a system is provided for disengaging a battery string from a direct-current bus of a vehicle when the DC bus is under a load. The system includes one or more contactors between the battery string and the DC bus. The system also includes a controller. The controller is configured to reduce a current limit of a power train of the vehicle to a first current level. The controller is also configured to open the one or more contactors. The controller is further configured to increase the current limit of the power train of the vehicle to a second current level.

Consistent with another disclosed embodiment of the present disclosure, a method is provided for disengaging a battery string from a direct-current DC bus of a vehicle when the DC bus is under a load. The method includes reducing, by a controller, a current limit of a power train of the vehicle to a first current level. The method also includes opening, by the controller, one or more contactors between the battery string and the DC bus. The method further includes increasing, by the controller, the current limit of the power train of the vehicle to a second current level.

Consistent with yet another disclosed embodiment of the present disclosure, a method is provided for disengaging battery strings from a DC bus of a vehicle when the DC bus is under a load. The method includes monitoring currents flowing through a plurality of battery strings connected in parallel to the DC bus of the vehicle. The plurality of battery strings are connected to the DC bus through respective contactors. The method also includes selecting one or more of the plurality of battery strings to be disengaged. The method further includes reducing the currents flowing through the one or more selected battery strings. The method further includes opening the respective contactors of the selected battery strings.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

For discussion purposes, the principles of the present disclosure are described in connection with the exemplary vehicle depicted in FIG. 1. Those skilled in the art will recognize that the principles of the present disclosure may be applied in any types of machine to disengage a battery from a DC bus when the DC bus is under a load. Moreover, it will be readily apparent to those skilled in the art that the principles of the present disclosure may also be used to engage the battery with the DC bus when the DC bus is under a load.

Figure 1:
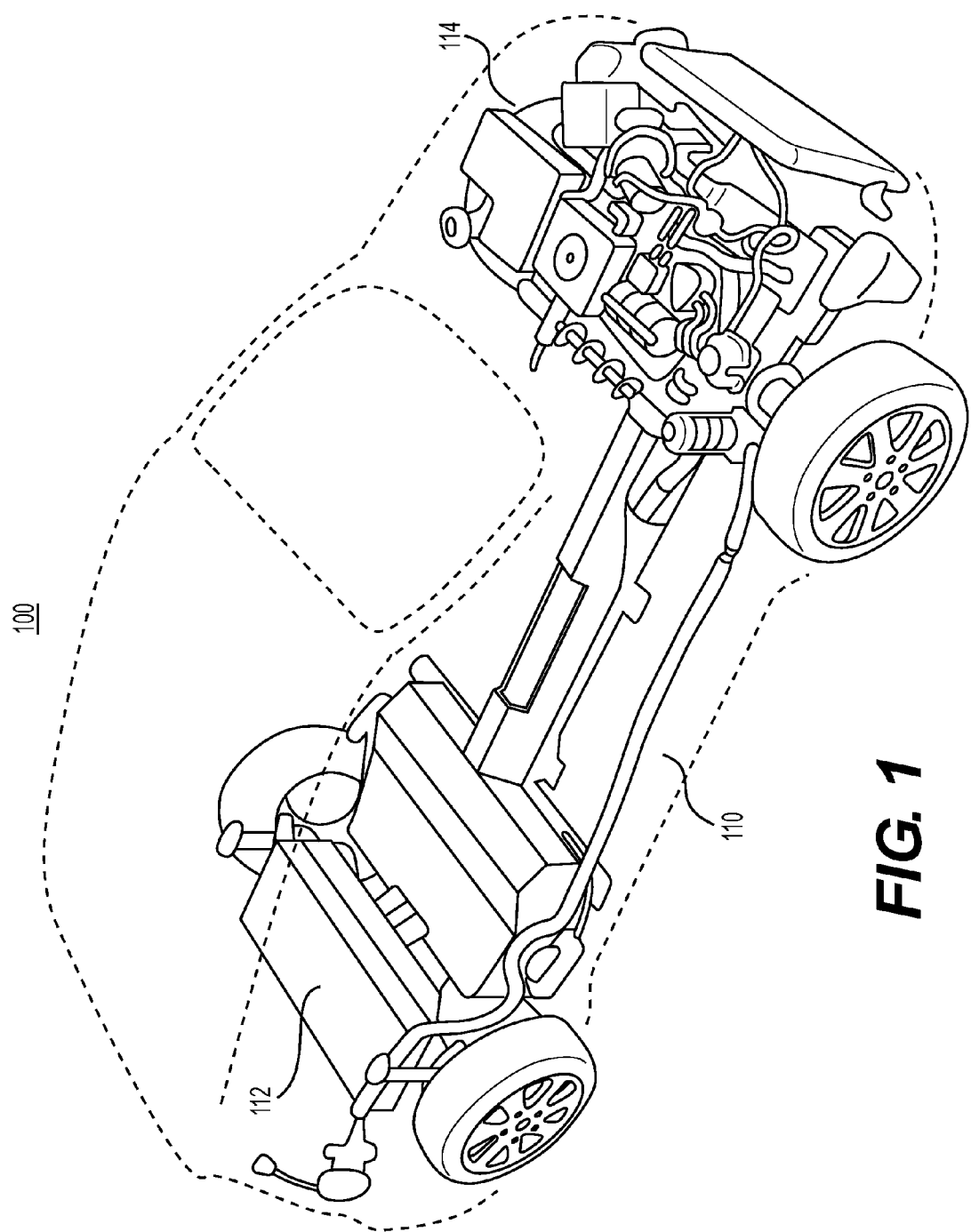
FIG. 1 is a schematic illustration of an exemplary vehicle including a system for disengaging a battery.

FIG. 1 is a schematic diagram illustrating a partial view of an exemplary vehicle 100. FIG. 1 will be described using an electric vehicle as an exemplary embodiment of vehicle 100, but vehicle 100 may be other types of vehicles. For example, vehicle 100 may be an electric vehicle, a fuel cell vehicle, a hybrid vehicle, or a conventional internal combustion engine vehicle. Vehicle 100 may have any body style, such as a sedan, a coupe, a sports car, a truck, a station wagon, an SUV, a minivan, or a conversion van. Referring to FIG. 1, vehicle 100 may include a power train 110 (illustrated by the solid lines in FIG. 1), which may further include one or more high-voltage battery packs 112 and an electric drive system 114 connected to a common DC bus.

Although FIG. 1 shows battery packs 112 located in the chassis and toward the rear of vehicle 100, battery packs 112 may be located in any other compartment of vehicle 100 such as, for example, within the hood area. Battery packs 112 may include one or more high-voltage battery strings connected in parallel. Each battery string may further include multiple battery cells connected in series or in parallel. Each battery string may output high-voltage DC, e.g., 400V, to electric drive system 114. Vehicle 100 may use multiple battery strings to improve system reliability and power availability. The parallel configuration of the battery strings may help to ensure that the disengagement of one battery string from a DC bus of vehicle 100 does not render other battery strings inoperative. Thus, each battery string may operate independently of the others, facilitating continued vehicle operation notwithstanding a failure of one or more of the other battery strings.

Battery packs 112 may be associated with a battery management system (BMS, not shown) for managing the usage and charging of a battery string in a safe and reliable manner. Specifically, the BMS may constantly monitor the battery state of charge (SOC) and state of health (SOH). If the BMS detects a fault in a particular battery string, such as an over temperature, overcurrent, overvoltage, undervoltage, loss of voltage monitoring, or loss of isolation, the BMS may cause the faulty string to be disengaged from the DC bus. Sometimes, the faulty string may be disengaged after vehicle 100 stops and the current being drawn from the battery is at a minimum. However, to ensure safe and flexible vehicle control, the faulty string is often disconnected while vehicle 100 is still running, i.e., while the DC bus is under a heavy load.

Vehicle 100 may use high power contactors or relays (not shown) to engage or disengage a battery string from the DC bus. A contactor may include a coil associated with an armature, a moving contact mechanically coupled to the armature, and a fixed contact. When a controller associated with the contactor directs current to the coil, a resulting magnetic field generated in the coil may attract the armature. Since the moving contact is mechanically coupled to the armature, the contactor may use the attraction to couple the moving contact with the fixed contact. The coupling of the two contacts may allow electrical current to flow from a battery string to a load. When the controller stops supplying current to the coil, the magnetic field discontinues and the moving contact is returned to its relaxed state by a force such as, for example, a spring or gravity. Consequently, the electrical connection between the battery string and the load is interrupted, preventing current flow from the battery string to the load. In other implementations of so-called "latching" contactors or relays, the contactor may contain multiple armatures and have two mechanically stable states, one where the contacts are connected and the other where the contacts are not. Energizing particular armatures may cause the contactor to transition from one state to the other.

Contactors, like most electro-mechanical devices, tend to fail after a finite number of iterations. Repeated arcing associated with switching a contactor between an on and off position may cause a failure. For example, as a contactor is opened and closed the movable contact becomes disconnected from the fixed contact and begins to retract to its rest state. Immediately after disconnect, the high voltage potential between the movable contact and the fixed contact may cause arcing in a small gap that is created while the movable contact retracts to its resting state. Over time, such electrical arcing may degrade the material of the contacts, leading to uneven surfaces. This degradation may prevent even distribution of current throughout the surface of the contacts. Such degradation may eventually weaken the tolerance of one or more of the contacts to high temperatures caused by the arcing, and potentially cause the two contacts to weld together. If the contacts become welded together, the mechanism used to return the movable contact to its relaxed state may not have enough force to separate the contacts, essentially short-circuiting the battery to the load.

If a contactor fails in a closed position, a battery associated with a load could erroneously continue to supply power to the load, causing an undue loss in power from the battery and, potentially, damaging the vehicle or its components and subsystems. The battery could also not be disconnected from an energy source, such as a battery charger or an electric drive system operating in a regenerative braking mode. This could lead to overcharge or overvoltage which could in turn lead to hazardous battery conditions. In some cases, the contactor failures may cause loss of high-voltage insulation and thus may present a safety hazard. As described below, in exemplary embodiments consistent with the present disclosure, vehicle 100 may employ a system to reduce the current flowing through a battery string before opening the respective contactors to disengage the string. This way, the contactor life may be prolonged and the vehicle maintenance cost may be reduced.

Electric drive system 114 may include various loads and control units, such as an electric motor with power electronics (e.g., an inverter system) and cooling system, a transmission including the differential, a brake system, a high-voltage air conditioning for vehicle interior climate control, and the like. For example, when vehicle 100 is accelerating or maintaining a constant speed, the inverter system may convert the DC supplied by battery packs 112 into an alternating current (AC) for driving the electric motors. However, when vehicle 100 is operating in a regenerative-braking mode, the electric motor may operate as a generator that outputs AC, which is converted by the inverter system into DC for charging battery pack 112 and/or driving other loads of power train 110.

Figure 2:
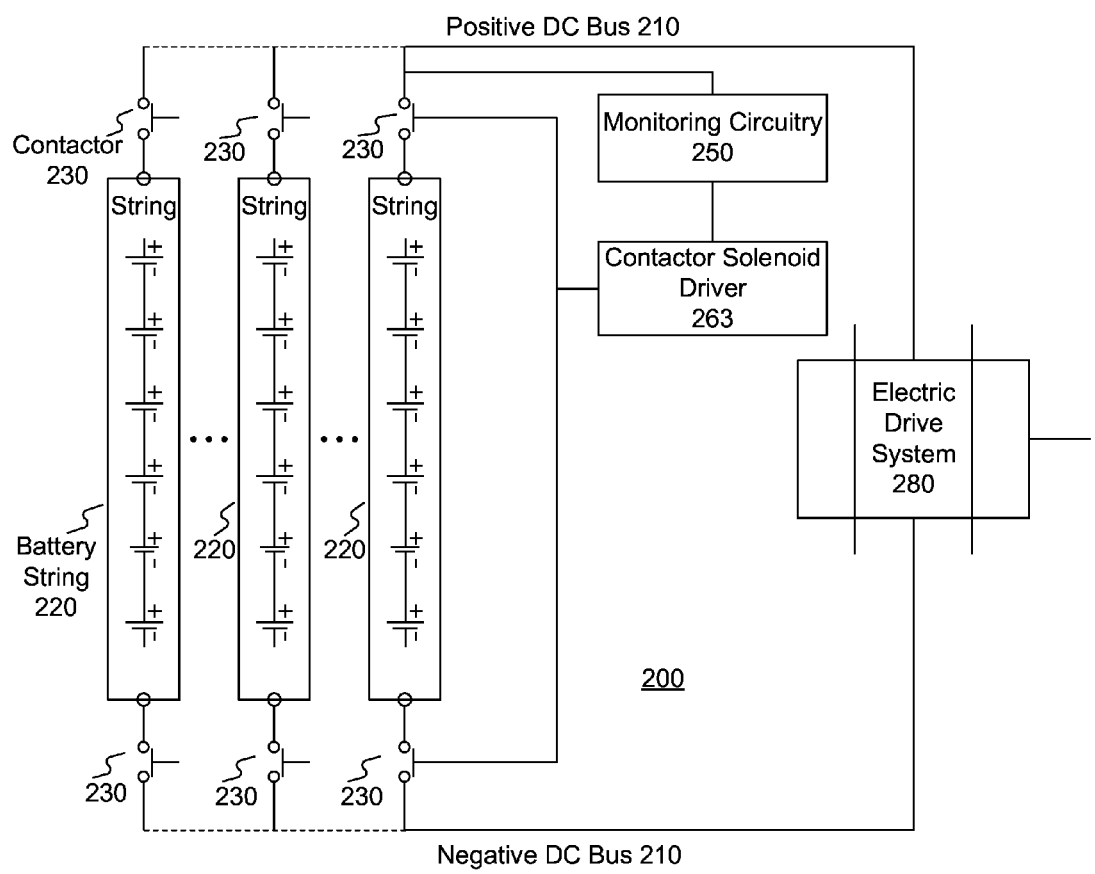
FIG. 2 is a schematic diagram illustrating an exemplary circuit used in the vehicle illustrated in FIG. 1, according to an exemplary embodiment.

FIG. 2 is a schematic diagram of an exemplary circuit 200 for disengaging a battery string with a DC bus when the DC bus is under a load, according to a first exemplary embodiment. For example, circuit 200 may be used in vehicle 100 illustrated in FIG. 1. Referring to FIG. 2, circuit 200 may include a DC bus 210, a plurality of high-voltage battery strings 220, a plurality of contactors 230, monitoring circuitry 250, a contactor solenoid driver 263, and an electric drive system 280.

DC bus 210 may include positive and negative power lines that electrically connect various components of a power train of vehicle 100, such as the plurality of high-voltage battery strings 220 and electric drive system 280, which may be similar to the above-described high-voltage battery packs 112 and electric drive system 114.

Each high-voltage battery string 220 may be equipped with protection devices, such as contactors 230, to disengage battery string 220 from DC bus 210 under different conditions. For example, if an operator of vehicle 100 turns off the vehicle, this opens contactors 230, i.e., disengages the plurality of battery strings 220 from DC bus 210, and activates other safety systems. Also, for example, when vehicle 100 is running but a particular battery string 220 experiences a faulty condition, such as an over temperature, overcurrent, overvoltage, undervoltage, loss of voltage monitoring, or loss of isolation, contactor solenoid driver 263 may generate a command signal to open contactors 230 associated with the faulty string.

Each high-voltage battery string 220 may be paired with two contactors 230, with a first contactor 230 configured to connect (contactor closed) or disconnect (contactor open) a positive terminal of battery string 220, and a second contactor 230 configured to connect or disconnect a negative terminal of battery string 220. This way, battery string 220 may be completely separated from the vehicle electric system after both contactors 230 are opened.

Each contactor 230 may be a high power contactor including a movable contact and a fixed contact. The movable contact may be mechanically coupled to an armature associated with a coil. The coil may be further connected to contactor solenoid driver 263. When contactor solenoid driver 263 energizes the coil, a magnetic field may be induced in the coil. The magnetic field may interact with the metallic material in the armature and causes movement of the armature and the movable contact. Thus, contactor solenoid driver 263 may control the closing and opening of contactor 230. Although FIG. 2 shows a contactor solenoid driver 263 connected with a pair of contactors 230, other contactors 230 may be connected to and controlled by the same or different contactor solenoid driver 263.

During a normal operation of vehicle 100, the plurality of battery strings 220 may be engaged to DC bus 210 (i.e., all contactors 230 closed) to supply power to the loads connected to DC bus 210. For example, while vehicle 100 is accelerating or maintaining a constant speed, one or more systems of vehicle 100 may draw a certain amount of current from each battery string 220. If a faulty condition is detected in a particular battery string 220, the faulty string should be disengaged from DC bus 210. To do so, the current limit of power train 110 may be reduced to a predetermined current level, so that the current drawn from the faulty string may be reduced accordingly. Then, contactor solenoid driver 263 may open the pair of contactors 230 associated with the faulty string and disengage the faulty string from DC bus 210. Once the faulty string is disengaged, the current limit of power train 110 may be increased to allow vehicle 100 to resume the normal operation.

In one embodiment, circuit 200 may include monitoring circuitry 250 connected to a terminal of each battery string 220 and contactor solenoid driver 263. Although FIG. 2 only shows monitoring circuitry 250 being connected to one battery string 220, it is contemplated that monitoring circuitry 250 may be connected to other battery strings 220 as well. Monitoring circuitry 250 may be configured to detect the current through contactors 230. For example, after detecting that the current through contactors 230 associated with the faulty string has decreased to a predetermined current level, monitoring circuitry may send a signal to contactor solenoid driver 263 to open contactors 230 and disengage the faulty string. In this manner, monitoring circuitry 250 may allow accurate control of contactors 230.

With the decreasing and increasing of the current limit of power train 110, the power consumed by electric drive system 280 may also be decreased and increased. Since state-of-art contactors have rapid response times, e.g., a few milliseconds, the interruptions to the operation of electric drive system 280, and thus the driving of vehicle 100, may be minimized. Moreover, sophisticated control schemes may be implemented to reduce the time needed to adjust the current limit of power train 110 so as to mitigate the interruptions.

The above-described solution allows contactors 230 to open under a reduced current. Therefore, the chances for the occurrence of electric arcing may be reduced and the life of contactors 230 may be extended. In the cases where vehicle 100 presents an alternative source or storage of energy that can be used to provide drive power, such as a capacitor, engine, fuel cell, or flywheel, electric drive system 280, monitoring circuitry 250 and control circuits associated with the alternative power source (not shown) may interact to supply drive power form the alternative source such that the interruptions to driving of vehicle 100 are even further minimized.

Figure 3:
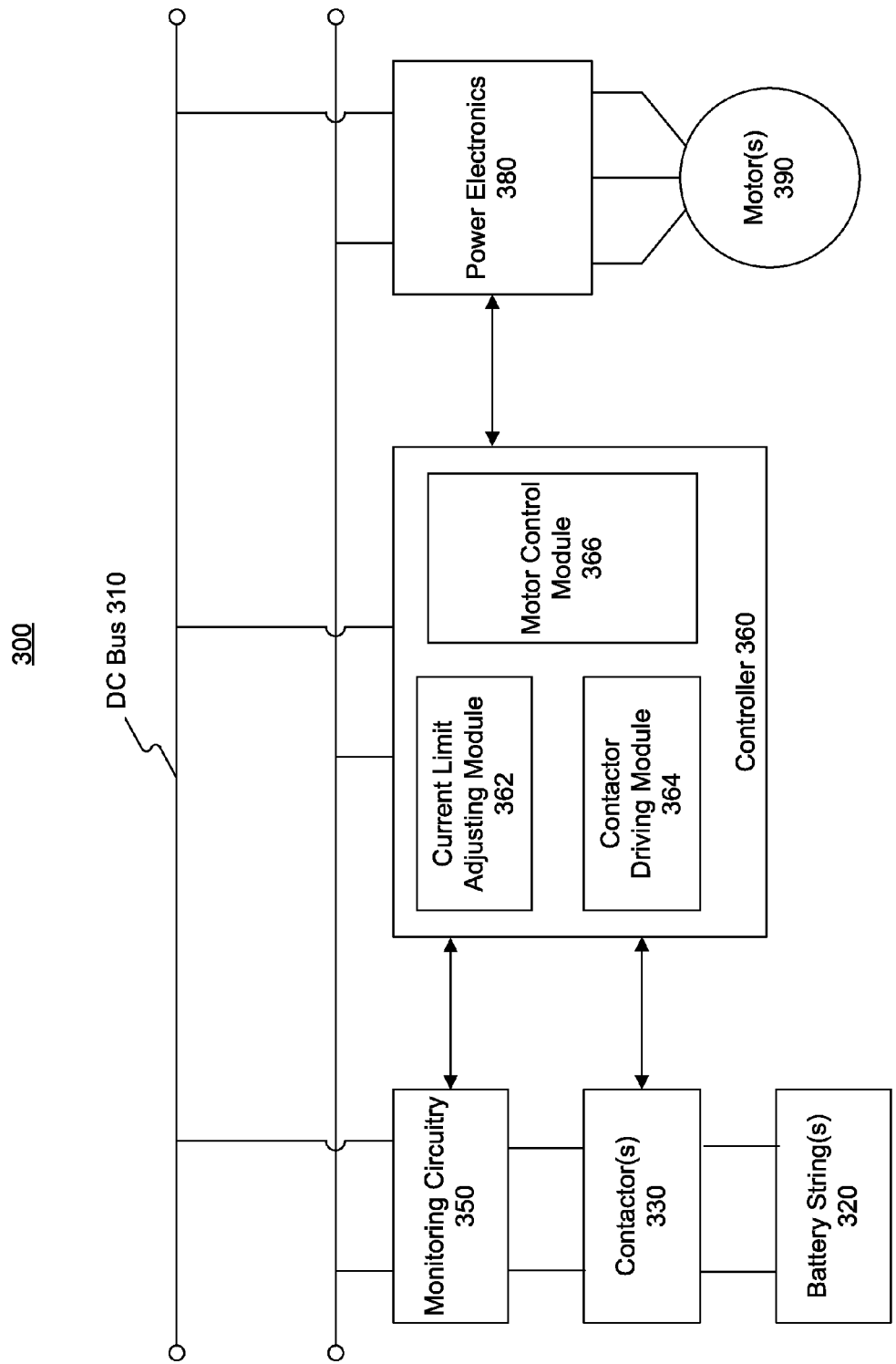
FIG. 3 is a block diagram of a system for disengaging a battery, consistent with the circuit illustrated in FIG. 2.

FIG. 3 is a block diagram of system 300 for disengaging a battery with a DC bus, consistent with circuit 200 illustrated in FIG. 2. For example, system 300 may be used in vehicle 100 illustrated in FIG. 1. Referring to FIG. 3, system 300 includes a DC bus 310, one or more battery strings 320, one or more contactors 330, monitoring circuitry 350, a controller 360, power electronics 380, and one or more motors 390.

Consistent with FIG. 2, the structures and functions of DC bus 310, battery strings 320, contactors 330, monitoring circuitry 350 may be similar to the structures and functions of DC bus 210, battery strings 220, contactors 230, and monitoring circuitry 250. Furthermore, power electronics 380 and motors 390 may be part of electric drive system 280.

Controller 360 may take many forms, including, for example, a computer-based system, a microprocessor-based system, a microcontroller or microprocessor operatively coupled with a memory, an electronic control module (ECM), an electronic control unit (ECU), or any other suitable control circuit or system. Controller 360 may also include one or more of an application-specific integrated circuit (ASIC), a field-programmable gate array (FPGA), and a logic circuit configured to allow controller 360 to function in accordance with the disclosed embodiments. In some embodiments, controller 360 is specially configured with hardware and/or software modules for performing functions of system 300. For example, controller 360 may include a current limit adjusting module 362, a contactor driving module 364, and a motor control module 366. The modules may be implemented as specialized circuitry integrated within controller 360, and/or specialized software executable by controller 360. Functions of the modules are discussed in further detail with respect to FIG. 4.

In exemplary embodiments, controller 360 may include one or more of the following components: a memory, a processing component such as a microcontroller or microprocessor operatively coupled with the memory, a storage device, an input/output (I/O) interface, and a communication component.

The processing component may be configured to receive signals from other electronics onboard or offboard vehicle 100 and process the signals to determine one or more conditions of the operations of system 300. The processing component may be further configured to generate and transmit a control signal via, for example, the I/O interface, to disengage a faulty string. In operation, the processing component may execute computer instructions stored in the memory and/or storage device.

The memory and the storage device may include any proper type of storage medium. The memory may include a non-transitory computer-readable storage medium including instructions for applications or methods executable by the processing component. The memory may also store data used for disengaging a faulty string, such as the current limits of power train 110 that allow contactors 330 to be opened without causing excessive electric arcing. For example, the non-transitory computer-readable storage medium may be a read-only memory (ROM), a random access memory (RAM), a flash memory, a memory chip (or integrated circuit), or the like. The storage device may include a volatile or non-volatile, magnetic, semiconductor, tape, optical, removable, nonremovable, or other type of storage device or computer-readable medium to provide additional storage space for controller 360.

The I/O interface may include one or more digital and/or analog communication devices that allow controller 360 to communicate with other systems and devices. For example, the I/O interface may receive signals from monitoring circuitry 350 that indicate a current level through contactors 330, and send the signals to the processing component for further processing. The I/O interface may also receive one or more control signals from the processing component, and send the control signals to contactors 330 to disengage a faulty string.

The communication component may be configured to facilitate communication, wired or wirelessly, between controller 360 and other devices, including the BMS and/or a user interface. The communication component may access a wireless network based on one or more communication standards, such as WiFi, LTE, 2G, 3G, 4G, 5G, etc. In one exemplary embodiment, the communication component includes a near field communication (NFC) module to facilitate short-range communications between controller 360 and other devices. In other embodiments, the communication component may be implemented based on a radio frequency identification (RFID) technology, an infrared data association (IrDA) technology, an ultra-wideband (UWB) technology, Bluetooth (BT) technology, or other technologies.

Figure 4:
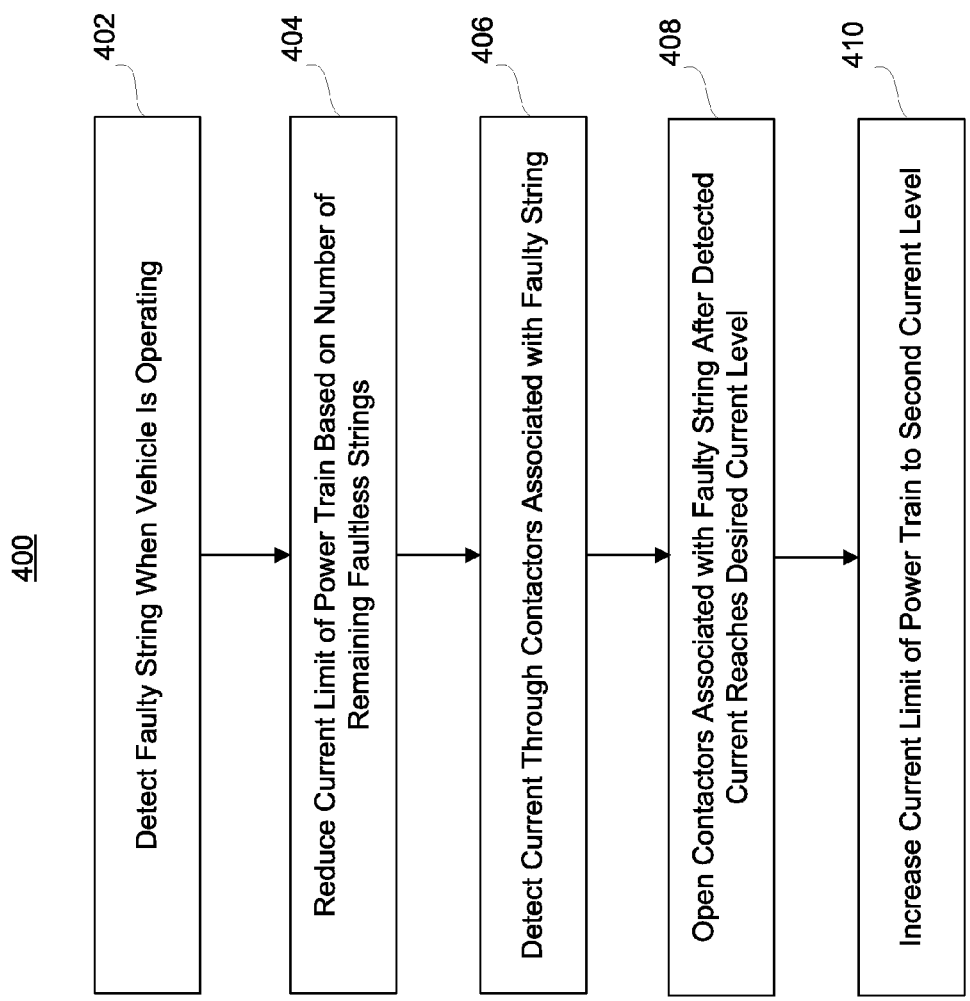
FIG. 4 is a flowchart of a method of using the system shown in FIG. 3.

FIG. 4 is a flowchart of an exemplary method 400 for disengaging a battery from a DC bus when the DC bus is under a load. For example, method 400 may be used in system 300. Method 400 may include the following steps 402-410.

In step 402, the BMS of vehicle 100 may detect a faulty string when vehicle 100 is operating. The BMS may include circuitry configured to monitor the working condition of battery strings 320. After detecting a battery string has experienced a faulty condition, the BMS may send one or more signals to controller 360 indicating that the faulty string should be disengaged.

In step 404, controller 360 may reduce the current limit of power train 110 to a first current level. After receiving the signals from the BMS, controller 360 may select the faulty string as the string to be disengaged from DC bus 210. Controller 360 may reduce the current flowing through the faulty string by reducing the current limit of power train 110. The first current level may be a preset value that allows the faulty string to be disengaged without causing excessive electric arcing in contactors 330. Current limit adjusting module 362 may be configured to reduce the current limit of power train 110 using any method known in the art. For example, motor control module 366 may control motors 390 to produce a torque to maintain normal driving of vehicle 100. However, after receiving an instruction to disengage the faulty string, current limit adjusting module 362 may send a control command to motor control module 366 for reducing the torque generated by motors 390. Motor control module 366 may then reduce the current supplied to power electronics 380 and thus reduce the torque generated by motors 390, which collectively may constitute the largest load for power train 110. The torque may be reduced to a level that prevents the current limit of power train 110 from exceeding the first current level.

In step 406, monitoring circuitry 350 may detect the current through contactors 330 associated with the faulty string. Monitoring circuitry 350 may output the detected current to controller 360 for further processing.

In step 408, controller 360 may open contactors 330 associated with the faulty string after the detected current reaches a desired current level. Contactor driving module 364 may be implemented as contactor solenoid driver 263 and constantly or periodically compare the detected current with the desired current level. If the detected current is equal to or below the desired current level, contractor driving module 364 may send control signals to open contactors 330 associated with the faulty string.

In one embodiment, motor control module 366 may operate some or all of motors 390 to enter into a regenerative-braking mode, e.g., allowing motors 390 to coast. As the back electromotive force (emf) in motors 390 builds up, the motor current may quickly fall to zero and eventually become negative, i.e., charging battery strings 320. In this case, contactor driving module 364 may be configured to open contactors 330 associated with the faulty string at or near a moment that the detected current reaches approximately zero. For example, a comparison circuit may be implemented to compare the detected current to a preset current value close to zero. When the detected current drops below the preset value, the comparison circuit may trigger the contactor driving module 364 to open contactors 330.

In step 410, after the faulty string is disengaged from DC bus 310, controller 360 may increase the current limit of power train 110 to a second current level. The second current level may be a value that allows vehicle 100 to resume normal operation. Since losing a battery string 320 may change the power supply scheme of vehicle 100, the current limit of power train 110 may be updated to a proper level according to the number of remaining faultless strings on DC bus 310. For example, current limit adjusting module 362 may send a control command to instruct motor control unit 366 to lift the limitation on the torque production by motors 390. Motor control unit 366 may further control motors 390 to produce the torque according to the newly established current limit.

The systems and method discussed above in connection with FIGS. 2-4 may facilitate the disengagement of a battery string from the DC bus of vehicle 100 without a need for additional hardware. By opening or closing the contactors under a reduced current, the life of the contactors may be prolonged and the maintenance cost of the vehicle battery system may be reduced. Furthermore, the brief interruption caused to the operation of vehicle 100 may be minimized by using fast responding contactors and sophisticated control schemes. For example, when vehicle 100 performs maneuvers such as accelerating or changing lanes, i.e., when operation interruptions should be avoided, the disengagement of the faulty string may be postponed until the maneuvers are completed.

Figure 5:
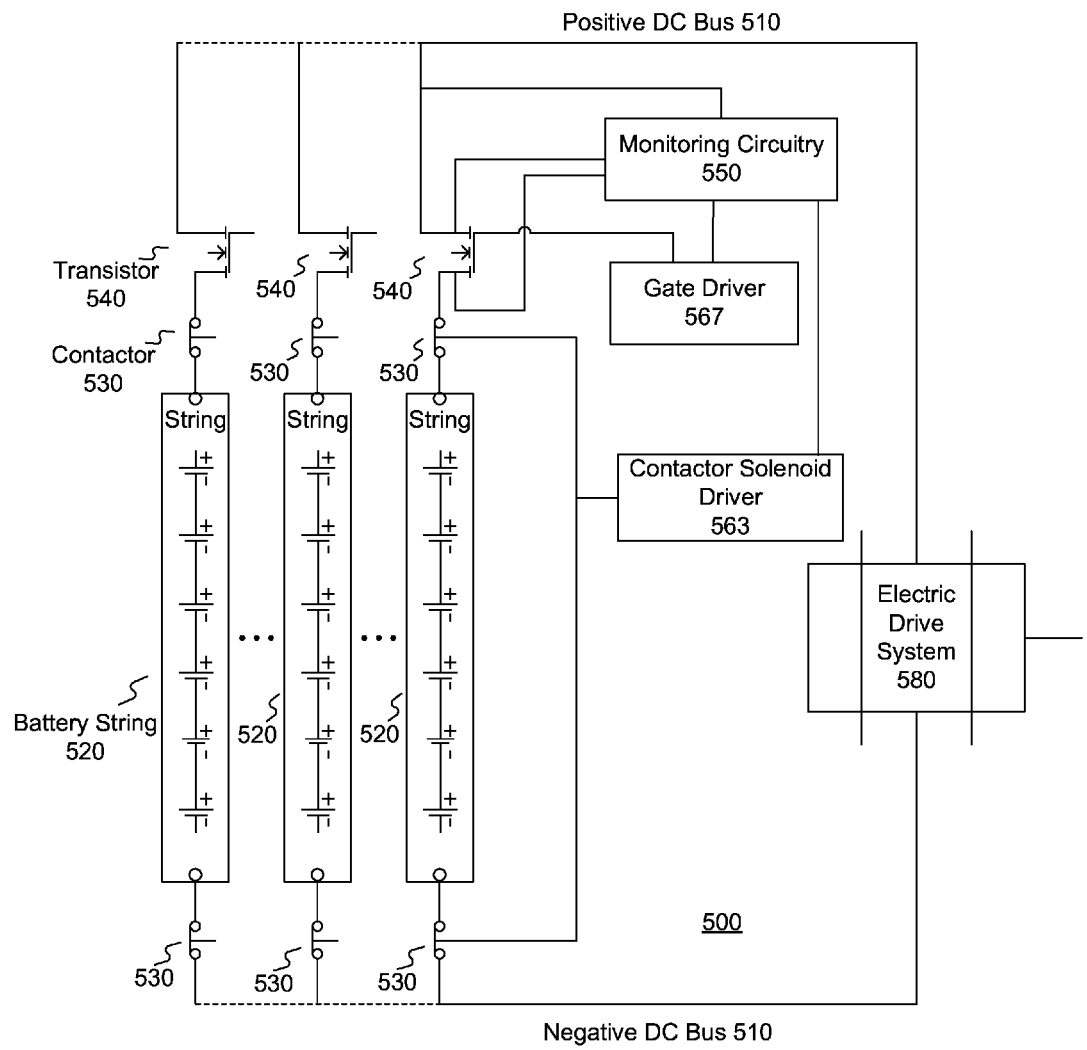
FIG. 5 is a schematic diagram illustrating an exemplary circuit used in the vehicle illustrated in FIG. 1, according to an exemplary embodiment.

FIG. 5 is a schematic diagram of an exemplary circuit 500 for disengaging battery string from a DC bus when the DC bus is under a load, according to a second exemplary embodiment. For example, circuit 500 may be used in vehicle 100 illustrated in FIG. 1. Referring to FIG. 5, circuit 500 may include a DC bus 510, a plurality of high-voltage battery strings 520, a plurality of contactors 530, a plurality of transistors 540, monitoring circuitry 550, a contactor solenoid driver 563, a gate driver 567, and an electric drive system 580. Among these components, DC bus 510, battery strings 520, contactors 530, contactor solenoid driver 563, and electric drive system 580 may be similar to DC bus 210, battery strings 220, contactors 230, contactor solenoid driver 263, and electric drive system 280 shown in FIG. 2.

Each transistor 540 may be a high power transistor, such as a metal-oxide-semiconductor field-effect transistor (MOSFET), or an insulated gate bipolar transistor (IGBT). Each transistor 540 is connected to gate driver 567 that can switch on and off transistor 540. Although FIG. 5 shows the connection between one transistor 540 and gate driver 567, other transistors 540 may be connected to and controlled by the same or different gate driver 567. Each transistor 540 may be connected in series with contactors 530. During normal operation of battery strings 320, gate driver 567 may switch on transistors 540 to allow current to flow from or to battery string 320 with minimal resistance. However, if a faulty string should be disengaged from DC bus 510, gate driver may switch off at least one transistor 540 associated with the faulty string to introduce an impendence between the faulty string and DC bus 510. This may reduce the current through contactors 530 associated with the faulty string and thus allow contactors 530 to be opened without causing excessive electric arcing.

Various considerations may be given to select proper transistors 540 for use in circuit 500. Transistors 540 may have a small "switch-on" resistance (i.e., $R_{DS(on)}$ of a MOSFET, and $R_{CE(on)}$ of an IGBT) to minimize power loss when battery strings 520 are engaged to DC bus 510 and operate normally. Transistors 540 may also have a high current rating (i.e., $I_D$ of a MOSFET, and $I_C$ of an IGBT) to allow high current to flow when transistors 540 are switched on and battery strings 520 are under normal operation. Furthermore, transistors 540 may also have a high voltage rating (i.e., $V_{DSS}$ of a MOSFET, and $V_{CES}$ of an IGBT) and be capable of blocking a voltage as high as the full bus voltage when transistors 540 are switched off. The current rating and voltage rating should leave a sufficient margin to account for voltage and current spikes, which are common in vehicle electric systems. For example, IXYS IXFN210N20P MOSFET may be a candidate for transistors 540 due to its low $R_{DS(on)}$ and high $I_D$. It is also well known to those skilled in the art that a plurality of transistors, either as discrete components or integrated together in a power module, can be used to switch high currents.

Transistors 540 are unidirectional; that is, they are intended to switch current in one direction. Thus, for example, a single transistor 540 used to switch current drawn from a battery string 520 to a load may not interrupt a current flowing from the load to battery string 520 during a regenerative-braking mode of vehicle 100. To interrupt current in both directions, more than one transistors 540 may be used for each battery string 520. For example, two transistors 540 may be connected in series.

Similar to monitoring circuitry 250 shown in FIG. 2, monitoring circuitry 550 may be configured to detect the current through contactors 530. For example, after detecting the current through contactors 530 associated with the faulty string has decreased to a predetermined current level, monitoring circuitry may send a signal to contactor solenoid driver 563 to open contactors 530 and disengage the faulty string.

To protect transistors 540 from overvoltage, monitoring circuitry 350 may be further configured to detect the voltage across transistors 540. When transistors 540 are switched on and large amounts of current flow through transistors 540, a desaturation mechanism may be used to ensure that the maximum saturation limits of transistors 540 are not reached. For example, if the voltage across transistors 540 approaches or exceeds $V_{DS(sat)}$ of a MOSFET or $V_{BE(sat)}$ of an IGBT, monitoring circuitry 350 may trigger gate driver 567 to switch transistors 540 off immediately or with a minimal delay, and trigger contactor solenoid driver 563 to open contactors 530 immediately or with a minimal delay. Similar mechanism may also be used to protect transistors 540 when they are switched off. If the voltage across transistors 540 approaches or exceeds the $V_{DSS}$ of a MOSFET or $V_{CES}$ of an IGBT, monitoring circuitry 350 may trigger contactor solenoid driver 563 to open contactors 530 immediately or with a minimal delay. In the above scenarios, although sometimes contactors 530 are opened under a high current, this may still be desirable to protect transistors 540 from being damaged.

Other operating measures may also be implemented to protect transistors 540 from overvoltage. For example, during engagement of a battery string 530 to DC bus 510, such as when vehicle 100 is started, transistors 540 may be switched on before contactors 530 are closed. This way, transistors 540 may be kept from being exposed to the full bus voltage.

Figure 6:
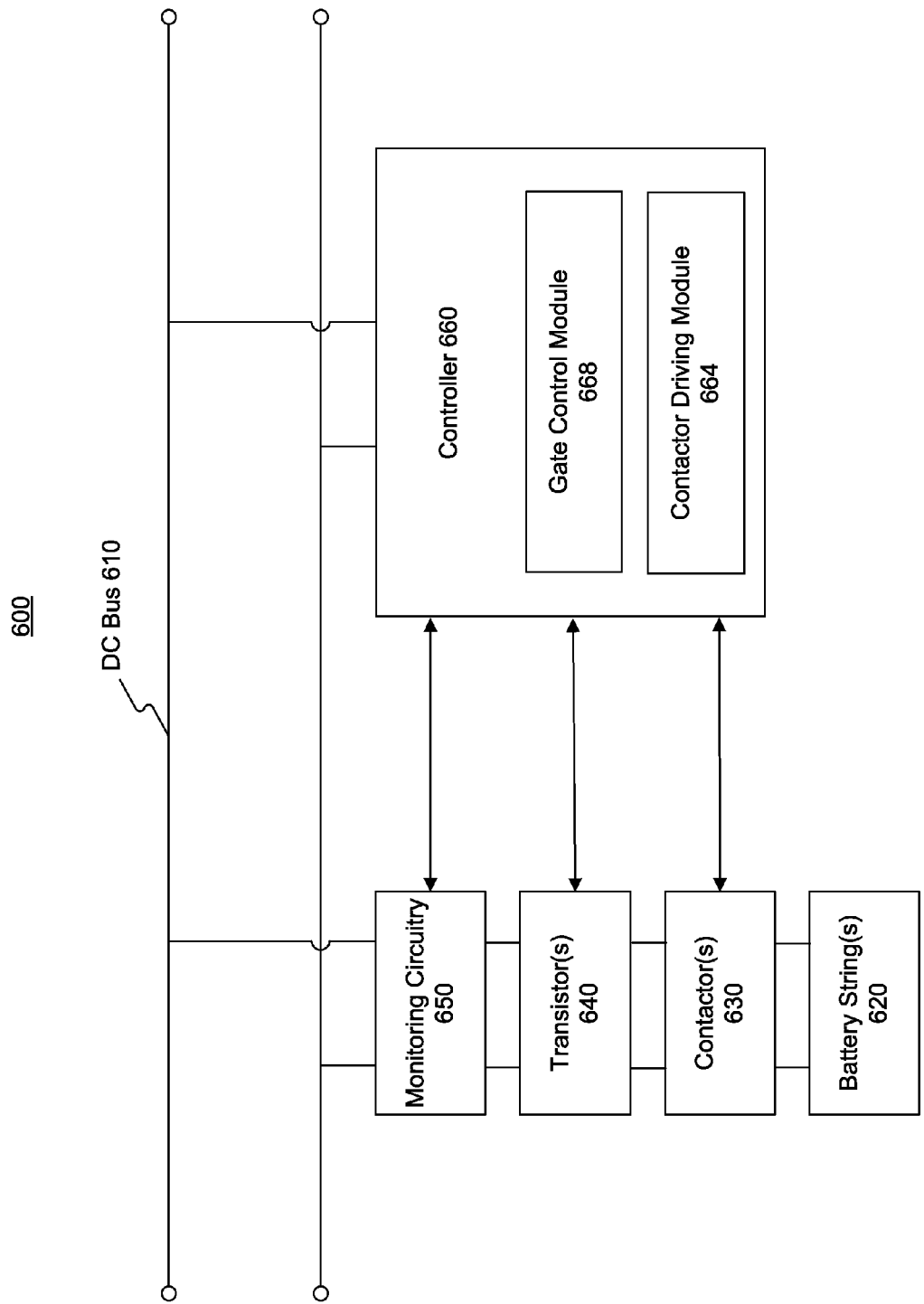
FIG. 6 is a block diagram of a system for disengaging a battery, consistent with the circuit illustrated in FIG. 5.

FIG. 6 is a block diagram of system 600 for disengaging a battery with a DC bus, consistent with circuit 500 illustrated in FIG. 5. For example, system 600 may be used in vehicle 100 illustrated in FIG. 1. Referring to FIG. 6, system 600 includes a DC bus 610, one or more battery strings 620, one or more contactors 630, one or more transistors 640, monitoring circuitry 650, and a controller 660.

Consistent with FIG. 5, the structures and functions of DC bus 610, battery strings 620, contactors 630, transistors 640, monitoring circuitry 650 may be similar to the structures and functions of DC bus 510, battery 520, contactors 530, transistors 540, and monitoring circuitry 550.

The structures of controller 660 may be similar to controller 360 shown in FIG. 3, and are not repeated here. In some embodiments, controller 660 is specially configured with hardware and/or software modules for performing functions of system 600. For example, controller 660 may include a contactor driving module 664 and a gate control module 668. The modules may be implemented as specialized circuitry integrated within controller 360, and/or specialized software executable by controller 660. Functions of the modules are discussed in further detail with respect to FIG. 7.

Figure 7:
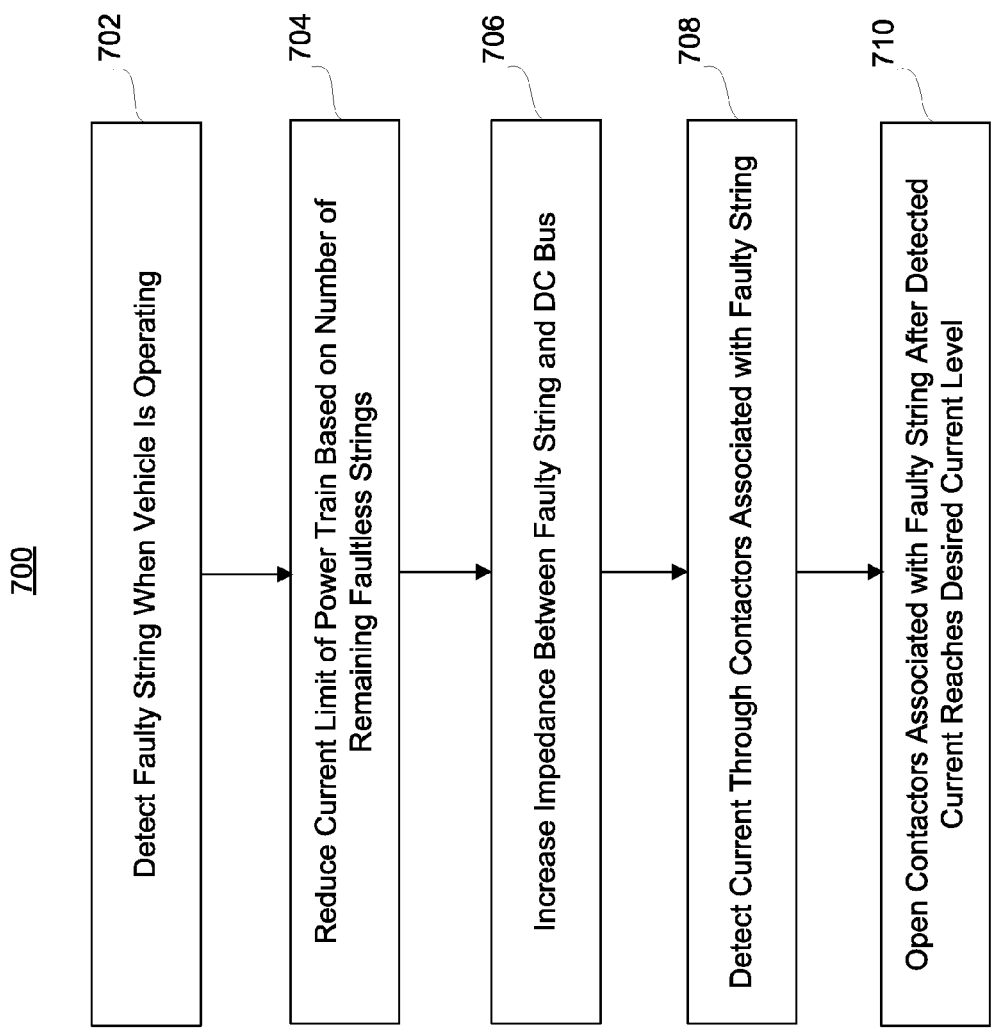
FIG. 7 is a flowchart of a method of using the system shown in FIG. 6.

FIG. 7 is a flowchart of an exemplary method 700 for disengaging a battery from a DC bus when the DC bus is under a load. For example, method 700 may be used in system 700. Method 700 may include the following steps 702-710.

In step 702, the BMS of vehicle 100 may detect a faulty string when vehicle 100 is operating. This step is similar to step 402 (FIG. 4). After detecting a battery string has experienced a fault condition, the BMS may send signals to controller 660 indicating that the faulty string needs to be disengaged.

In step 704, controller 660 may reduce the current limit of power train 110 based on the number of remaining faultless strings. This way, controller 660 may ensure no excessive current will flow from or to the remaining faultless strings after disengagement of the faulty string. Such reduction may not cause significant interruption to the current limit because controller may only reduce the portion of the current limit originally attributed to the faulty string, while still make the remaining faultless string operating at their normal capacities.

In step 706, controller 660 may increase an impedance between the faulty string and DC bus 610. In some exemplary embodiments, controller 660 may increase the impedance by switching off at least one transistor 640 associated with the faulty string. After receiving the request to disengage the faulty string from the BMS, gate control module 668 may switch off at least one transistor 640 associated with the faulty string to increase the impedance between the faulty string and DC bus 610. The increase of impedance may subsequently reduce the current flowing from or to the faulty string. However, this does not cause a significant interruption to the current limit of power train 110 or to the current levels from or to other battery strings 620. In some other exemplary embodiments, controller 660 may also increase and/or decrease the impedance by controlling at least one transistor 640 temporarily in the linear region.

In step 708, monitoring circuitry 650 may detect the current through contactors 630 associated with the faulty string. Monitoring circuitry 650 may output the detected current to controller 660 for further processing.

In step 710, controller 660 may open contactors 630 associated with the faulty string after the detected current reaches a desired current level. Contactor driving module 664 may be implemented as contactor solenoid driver 563 and compare the detected current with the desired current level. If the detected current is equal to or below the desired current level, contractor driving module 664 may open contactors 630 associated with the faulty string.

The combination of transistors and contactors discussed in connection with the systems and method described in FIGS. 5-7 may facilitate efficient disengagement of a battery string from the DC bus of vehicle 100. By opening or closing the contactors under a reduced current, the life of the contactors may be prolonged and the maintenance cost of the vehicle battery system may be reduced. Moreover, since this solution does not require significant reduction to the current limit of the power train, interruptions to the operation of vehicle 100 may be avoided.

It will be apparent to those skilled in the art that various modifications and variations can be made to the disclosed systems and methods. Other embodiments will be apparent to those skilled in the art from consideration of the specification and practice of the present disclosure. It is intended that the specification and examples be considered as exemplary only, with a true scope being indicated by the following claims and their equivalents.

What is claimed is:

1. A system for disengaging a battery string from a direct-current (DC) bus of a vehicle when the DC bus is under a load, comprising:
   one or more contactors between the battery string and the DC bus;
   monitoring circuitry configured to detect a current through the one or more contactors; and
   a controller configured to:
   reduce a current limit of a power train of the vehicle to a first current level;
   operate at least one motor of the power train in a regenerative-braking mode, to reduce the detected current to approximately zero;
   open the one or more contactors after the detected current reaches approximately zero; and
   increase the current limit of the power train of the vehicle to a second current level, after the one or more contactors are opened.

2. The system of claim 1, wherein the controller is further configured to reduce the current limit of the power train by reducing a traction torque generated by at least one motor of the power train.

3. The system of claim 1, wherein the one or more contactors include:
   a first contactor configured to connect or disconnect a positive terminal of the battery string with the DC bus; and
   a second contactor configured to connect or disconnect a negative terminal of the battery string with the DC bus.

4. A method for disengaging a battery string from a direct-current (DC) bus of a vehicle when the DC bus is under a load, comprising:
   detecting, by monitoring circuitry, a current through one or more contactors between the battery string and the DC bus;
   reducing, by a controller, a current limit of a power train of the vehicle to a first current level;
   operating, by a controller, at least one motor of the power train in a regenerative-braking mode, to reduce the detected current to approximately zero;
   opening, by the controller, the one or more contactors after the detected current reaches approximately zero; and
   increasing, by the controller, the current limit of the power train of the vehicle to a second current level, after the one or more contactors are opened.

5. The method of claim 4, wherein reducing the current limit of the power train comprises:
   reducing a traction torque generated by at least one motor of the power train.

6. The method of claim 4, further comprising:
   operating, by the controller, at least one motor of the power train in a regenerative-braking mode to reduce the detected current to approximately zero.

7. A method for disengaging battery strings from a direct-current (DC) bus of a vehicle when the DC bus is under a load, comprising: monitoring currents flowing through a plurality of battery strings connected in parallel to the DC bus of the vehicle, the plurality of battery strings being connected to the DC bus through respective contactors;
   selecting one or more of the plurality of battery strings to be disengaged;
   reducing the currents flowing through the one or more selected battery strings;
   operating at least one motor of the power train in a regenerative-braking mode, to reduce the monitored currents to approximately zero; and
   opening the respective contactors of the selected battery strings after the currents flowing through the: selected battery strings reach approximately zero.

8. The method of claim 7, wherein selecting the one or more of the plurality of battery strings to be disengaged further comprises:
   detecting faulty conditions in the one or more battery strings.

9. The method of claim 8, wherein the faulty conditions include at least one of an over temperature in a battery string, overcurrent in the battery string, overvoltage across the battery string, undervoltage across the battery string, loss of voltage monitoring of the battery string, or loss of isolation of the battery string.

10. The method of claim 7, wherein reducing the currents flowing through the one or more selected battery strings further comprises:
    reducing a current limit of a power train of the vehicle to a first current level.

11. The method of claim 10, further comprising:
    after opening the respective contactors of the selected battery strings, increasing the current limit of the power train to a second current level.

12. The method of claim 10, further comprising:
    reducing the current limit of the power train by reducing a traction torque generated by at least one motor of the power train.

13. The method of claim 7, wherein reducing the currents flowing through the one or more selected battery strings further comprises:
    operating at least one motor of a power train of the vehicle in a regenerative-braking mode.

14. The method of claim 13, further comprising:
operating the motor in the regenerative-braking mode by coasting the motor.

15. The method of claim 7, wherein the respective contactors of a battery string include:
a first contactor configured to connect or disconnect a positive terminal of the battery string with the DC bus; and
a second contactor configured to connect or disconnect a negative terminal of the battery string with the DC bus.

* * * * *